United States Patent
Anderson

(10) Patent No.: US 11,452,404 B2
(45) Date of Patent: Sep. 27, 2022

(54) PIZZA OVEN

(71) Applicant: Mark Anderson, Chicago, IL (US)

(72) Inventor: Mark Anderson, Chicago, IL (US)

( * ) Notice: Subject to any disclaimer, the term of this patent is extended or adjusted under 35 U.S.C. 154(b) by 626 days.

(21) Appl. No.: 16/540,005

(22) Filed: Aug. 13, 2019

(65) Prior Publication Data

US 2020/0054168 A1 Feb. 20, 2020

Related U.S. Application Data

(60) Provisional application No. 62/718,951, filed on Aug. 14, 2018.

(51) Int. Cl.
- *A47J 37/07* (2006.01)
- *A47J 37/06* (2006.01)
- *A21B 5/00* (2006.01)

(52) U.S. Cl.
CPC ............. *A47J 37/0658* (2013.01); *A21B 5/00* (2013.01); *A47J 37/0786* (2013.01)

(58) Field of Classification Search
CPC .... A47J 37/06; A47J 37/0623; A47J 37/0629; A47J 37/0658; A47J 37/0676; A47J 37/0694; A47J 37/0704; A47J 37/0713; A47J 37/0718; A47J 37/0727; A47J 37/0759; A47J 37/0763; A47J 37/0768; A47J 37/0786; A47J 37/0885; A21B 5/00
USPC .......................................... 99/340, 345, 447
See application file for complete search history.

(56) References Cited

U.S. PATENT DOCUMENTS

| | | | |
|---|---|---|---|
| 4,800,865 A * | 1/1989 | Setzer | A47J 37/0704 |
| | | | 99/401 |
| 7,686,010 B2 | 3/2010 | Gustavsen | |
| 9,182,129 B2 * | 11/2015 | Dahle | A47J 37/0727 |
| 9,491,951 B2 * | 11/2016 | Case | A47J 37/0704 |
| 9,635,979 B2 | 5/2017 | Abrams et al. | |
| 10,827,878 B2 * | 11/2020 | Baker | A47J 37/0658 |
| 2002/0017290 A1 | 2/2002 | Hines, Jr. | |
| 2003/0145740 A1 | 8/2003 | Stark | |
| 2006/0102167 A1 | 5/2006 | Driscoll, Jr. | |
| 2010/0124596 A1 | 5/2010 | Nelson | |
| 2013/0276643 A1 * | 10/2013 | Krolick | A47J 37/0623 |
| | | | 99/447 |

(Continued)

OTHER PUBLICATIONS https://www.kettlepizza.com, date unknown, author unknown.

(Continued)

*Primary Examiner* — Hung D Nguyen

(57) ABSTRACT

A pizza oven is disclosed for cooking pizza or other food items on a barbecue grill. The pizza oven includes a top wall and a sidewall that together define an interior space sized and shaped to receive the food item to be cooked. The top wall includes one or more projections extending from an inner surface of the top wall into the interior space. When the pizza oven is positioned on the grates of a heated grill, heated air from the grill enters the interior space through a gap between the side walls and the food item. The heated air then contacts the one or more projections and passes over the top surface of the food item to cook the food item by convection. The one or more projections are sized and shaped to cause the heated air to move in a rotational pattern in the interior space. The rotational pattern allows the food item to be cooked faster and more evenly.

19 Claims, 3 Drawing Sheets

(56) References Cited

U.S. PATENT DOCUMENTS

2014/0000585 A1* 1/2014 Touma .................... F24B 1/003
126/9 R
2017/0020337 A1* 1/2017 Borovicka .......... A47J 37/0786

OTHER PUBLICATIONS https://teachersfirstchoice.com.au/coal-pizza-ovens-michigan, "Man Builds Coal-Oven Grill Simulator—Pizza" date unknown, author unknown.
https://bakerstonebox.com, date unknown, author unknown.
https://countertoppizzaoven.com/firebox-bbq-pizza-oven-review, date unknown, author unknown.
https://www.james-russell.co.uk/buy.cfm/kitchen-gadgets/blaze-box-stainless-steel-pizza-oven/76/yes/155082?getimage=1, date unknown, author unknown.
https://www.blazegrills.com/product/blaze-pizza-stone, date unknown, author unknown.

\* cited by examiner

PIZZA OVEN

PRIORITY

The present application claims the benefit of domestic priority based on U.S. Provisional Patent Application 62/718,951 filed on Aug. 14, 2018, the entirety of which is incorporated herein by reference.

BACKGROUND

Few foods are as ubiquitously consumed and as universally loved as pizza. Pizzas and other flat breads can be served in numerous styles and with a vast array of toppings making it one of the most versatile dishes around the globe. Also, one of the most popular cooking techniques is to cook food on an outdoor gas or charcoal barbecue grill.

While pizzas are fun and relatively easy to make at home, there is a noticeable difference between the quality of a pizza cooked in a specially designed, high temperature oven and one cooked in a conventional home oven. A professional oven, often a brick oven, provides a sufficiently high cooking temperature to optimally cook a pizza or other food items, and it maintains a consistent temperature that evenly distributes the heat within the oven. One of the reasons pizza is so good when cooked in a high temperature oven is that the water in the dough vaporizes almost immediately when exposed to the extreme heat, and the crust puffs up with bubbles and blisters, burn spots, and a "leopard spotting" pattern on the bottom and outsides of the crust. The result can be a perfectly cooked bottom crust and perfectly cooked top of the pizza that is difficult to duplicate in other environments. A traditional home oven, for example, only heats to about 550 degrees F. which is lower than the temperature necessary to achieve a desired crust. Since the luxury of having a professional high temperature oven or outdoor brick oven installed at a home is not within everyone's budget, most people are forced to choose between the quality of a pizza made at a pizzeria and the convenience of making a pizza at home.

Recently, devices have entered the market that are designed to create a high temperature pizza cooking environment on a conventional gas or charcoal barbecue grill. Though they elevate the pizza-making experience, these existing devices suffer from many drawbacks. For example, most conventional pizza ovens cook a pizza with radiant heat. These designs use thick metal or brick tiles that need to be pre-heated for an extended period of time, usually around an hour, in order to get sufficiently hot to cook the pizza using the radiant heat. This is an inconvenient amount of time to wait to cook a pizza, and it uses a lot of fuel. In addition, these devices provide inconsistent heating. The devices create hot spots. For example, the back of the grill will often have more heat than the front of the grill. Because of these heat spots, the grill lid needs to be opened and closed repeatedly so the pizza can be rotated. If the pizza is not rotated, it will cook unevenly due to the hot spots. It is also difficult to maintain consistent cooking temperature in some current designs that have a large opening in the front of their design. Compounding the problem of having to rotate the pizza, the entire grill cavity loses too much heat when the grill lid is opened or remains open and exposed to ambient air, further creating uneven heating properties inside the cooking cavity. This constant fluctuation of heat energy not only creates a poor and uneven cooking environment for the pizza, but it also creates the need to re-heat the cooking environment for the pizza before the next pizza can be cooked. Accordingly, in order to evenly cook a pizza using previously existing designs, the cooking process requires rotating the cooking pizza once or multiple times, thereby lengthening the cooking time and lowering the quality of the resulting pizza.

There is therefore a need for an improved pizza oven. There is further a need for a pizza oven that cooks by both convection and radiation and in a consistent manner. There is still further a need for a pizza oven that is simple, lightweight, and portable. There is still further a need for a pizza oven that can cook a pizza in less than five minutes. There is still further a need for a pizza oven that can cook a pizza in less than two or three minutes, and as little as 90 seconds which is the same amount of time it takes for a professional brick pizza oven to cook a pizza. There is still further a need for a pizza oven that can pre-heat in 15 minutes or less.

SUMMARY

The present invention satisfies these needs. In one aspect of the invention, an improved pizza oven is provided.

In another aspect of the invention, a pizza oven is provided that cooks pizza on a conventional grill in an improved manner.

In another aspect of the invention, a pizza oven is provided that cooks pizza on a conventional grill, the pizza oven using convection and radiated heat to cook the pizza consistently.

In another aspect of the invention, a pizza oven is provided that cooks pizza on a conventional grill, the pizza oven including one or more projections or fins to facilitate cooking the pizza by convection.

In another aspect of the invention, a pizza oven is provided that cooks pizza on a conventional grill, the pizza oven including one or more projections or fins to facilitate cooking the pizza by rotating convection currents.

In another aspect of the invention, a pizza oven is provided that cooks pizza on a conventional grill, the pizza oven cooking the pizza evenly without the need for turning the pizza.

In another aspect of the invention, a pizza oven is provided that cooks pizza on a conventional grill, the pizza oven being able to preheat, cook the pizza, and/or cook a subsequent pizza quickly.

In another aspect of the invention, a pizza oven is provided that is a portable pizza oven useable with a conventional grill.

In another aspect of the invention, a pizza oven is provided that is incorporated into the design of a gas or charcoal grill.

In another aspect of the invention, a pizza oven is usable on the grates of a grill, and the pizza oven comprises a top wall and a sidewall that together define an interior space sized and shaped to receive a food item to be cooked, the top wall including one or more projections extending from an inner surface of the top wall into the interior space, wherein when the pizza oven is positioned on the grates of a heated grill, heated air from the grill enters the interior space through a gap between the side walls and the food item, wherein the heated air then contacts the one or more projections and passes over the top surface of the food item to cook the food item by convection, and wherein the one or more projections are sized and shaped to cause the heated air to move in a rotational pattern in the interior space.

In another aspect of the invention, a pizza grill comprises a grill cavity having grates thereabove, and a pizza oven positionable on the grates, the pizza oven comprising a top wall and a sidewall that together define an interior space sized and shaped to receive a food item to be cooked, the top wall including one or more projections extending from an inner surface of the top wall into the interior space, wherein when the pizza oven is positioned on the grates and the grill cavity is heated, heated air from the grill cavity enters the interior space through a gap between the side walls and the food item, wherein the heated air then contacts the one or more projections and passes over the top surface of the food item to cook the food item by convection, and wherein the one or more projections are sized and shaped to cause the heated air to move in a rotational pattern in the interior space.

In another aspect of the invention, a method of cooking a food item on a grill comprises heating the grill, placing a pizza oven on grates of the grill, the pizza oven comprising a top wall and a sidewall that together define an interior space sized and shaped to receive the food item to be cooked, the top wall including one or more projections extending from an inner surface of the top wall into the interior space, inserting the food item into the interior space, and cooking the food item in the interior space by allowing heated air from the grill to enter the interior space and to contact the one or more projections so that the heated air passes over the top surface of the food item to cook the food item by convection, wherein the one or more projections are sized and shaped to cause the heated air to move in a rotational pattern in the interior space.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

DESCRIPTION

The present invention relates to an oven. In particular, the invention relates to a pizza oven that may be used with or as a conventional grill at home or on the road. Although the pizza oven is illustrated and described in the context of being useful for making pizza, the present invention can be useful in other instances. Accordingly, the present invention should not be limited just to the examples and embodiments described herein.

Figure 1A:
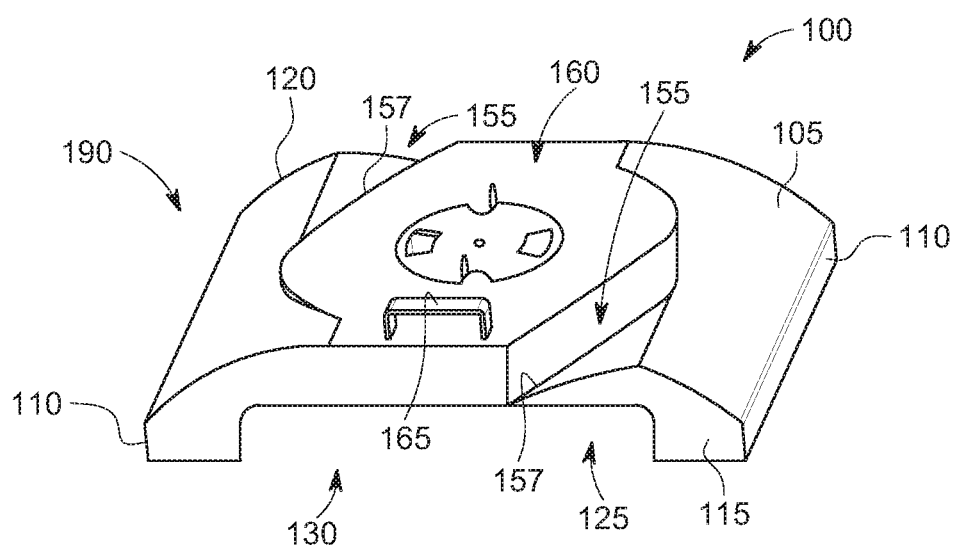
FIG. 1A is a schematic perspective front view of a pizza oven according to one version of the invention.

FIG. 1A shows a pizza oven 100 according to a version of the invention. The pizza oven 100 is made up of a top wall 105, a sidewall made up of a pair of lateral walls 110, a front wall 115 and a rear wall 120. The top wall 105 and the sidewall define an interior space 125 that can be heated as will be described to cook a pizza or other food item therein. An opening 130 in the front wall 115 provides access to the interior space 125. The top wall 105 can have a rounded contour, as shown in FIG. 1A or can be flat. The rounded contour can be at least partially dome shaped, partially cylindrical, and/or partially ovate. By oven it is meant any shaped object that at least partially encloses an interior that can be heated either by the oven or by another heat source and that at least partially contains the heat in the interior. By pizza it is meant any type of flat bread with or without toppings. By pizza oven it is meant any oven as defined above that is capable of cooking a pizza as defined or other food item, such as one or more of chicken wings, meatballs, charred vegetables, panouzzo sandwiches, and steaks, or that may be used to be heated to a high temperature for a purpose other than cooking.

Figure 1B:
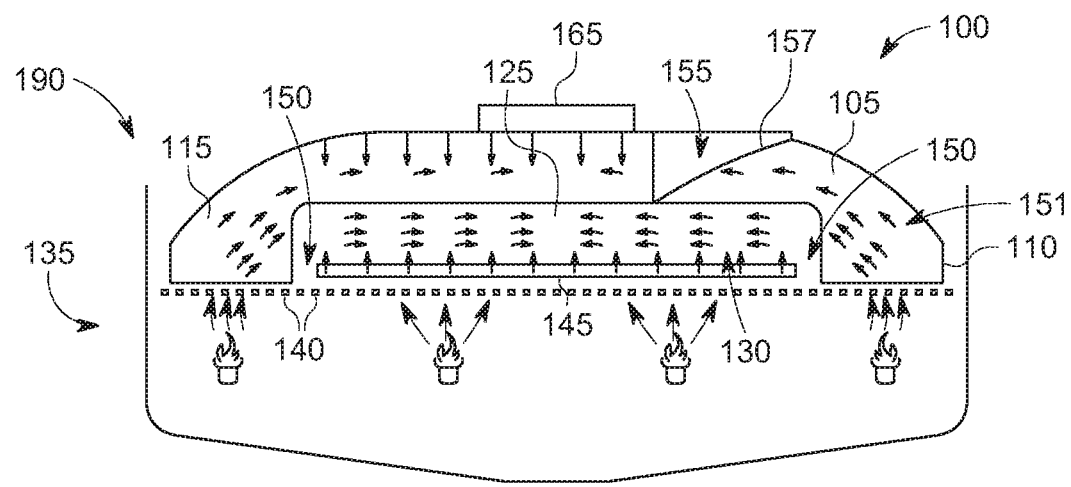
FIG. 1B is a schematic sectional side view of the pizza oven of FIG. 1A in use.

In one version, the pizza oven 100 is particularly useful for cooking a pizza on a grill 135, such as a home gas or charcoal barbecue grill, as shown in FIG. 1B. The pizza oven 100 is placed directly on grates 140 of the grill 135. The grates 140 are located above a grill cavity that contains the heat source for the grill 135. For example, the heat source may be burning charcoal or propane or the like. The pizza oven 100 may be open on its bottom and heat from the grill is contained within the interior space 125. When the temperature is sufficiently high, an uncooked or partially cooked pizza may be inserted through opening 130 so that it is cooked by the heat contained within the interior space 125.

In one version, as shown in FIG. 1B, a pizza stone 145 or baking stone or other flat surface may be provided for supporting the pizza within the interior space 125. The pizza stone may be made from for example cordierite, ceramic, tile, or metal, such as those commercially available from Pizzacraft® or Nerd Chef. The pizza stone 145 provides a cooking surface for the bottom of the pizza so it does not burn from the direct heat of the fire below. The pizza stone 140 is positionable on grates 140 and is of a height sufficiently small to provide sufficient clearance for the placement of a pizza thereon without the pizza contacting the top of the pizza oven 100. Alternatively, the pizza can be placed directly on the grates 140 without the need for the pizza stone 145.

Advantageously, in one version of the invention, the pizza is cooked in the interior space 125 by a combination of heat transfer methods. For example, the bottom of the pizza is cooked by conduction from the pizza stone 145 or the grates 40 and/or by direct heat or fire from the grill 135. The top of the pizza is cooked by radiant heat from the walls of the pizza oven and by convection as heated air flow across the top. By convection it is meant heat transfer due to bulk movement of molecules within fluids, such as air and in particular moving air. In the heating and cooking context, convection refers to the passages or circulation of heated air over or around an object that is to be heated or cooked. The movement of the heated air across the surface facilitates heat transfer and can therefore heat in a quicker manner. A gap 150 is provided between the sidewall and the pizza stone 145 and/or the edge of the pizza, such as between the lateral walls 110 and the pizza stone 145 and/or the edge of the pizza. The gap 150 is a sufficiently large space 150 that heated air 151 is allowed to pass up through the gap 150 as the heated air 151 rises from the grill 135. The heated air 151 rises and makes contact with the top wall 105 which directs the heated air 151 laterally through the interior space 125. The heated air 151 then passes over and across the top of the pizza to cook the top of the pizza. Thus, the top of the pizza is cooked by convection from the heated air 151 and by radiant heat from the walls of the pizza oven 100.

In one version, the pizza oven 100 includes one or more features that improve the convective cooking of the pizza in the interior space 125. For example, one or more projections 155 may be positioned on the inner surface 156 of the top wall 105. The projections 155 extend from the inner surface 156 of the top wall 105 into the interior space 125. The projections 155 divert the flow of the heated air 115 into a particular pattern. The projections 155 can take any form and can include deflectors that extend from the inner surface 156, one or more channels, troughs that extend into the inner surface 155, and any type of surface treatment that encourages the flow pattern. In one version, the one or more projections 155 include one or more fins 157. The fins 157 are sized and shaped to cause the convective air to move in the interior space 125 in a particular pattern above the pizza. For example, in the version of FIGS. 1A and 1B, the fins 157 are sized and shaped to cause the convective air to move in a rotational pattern within the interior space 125 above the pizza. By rotational pattern, it is meant that the heated air flows in a pattern over the top of the pizza or other food item that is rotational, circular, revolving, swirling, spiral, oval, elliptical, or other shape that mixes air and heat from the rear of the interior space with air and heat from the front of the interior space. The fins 157 may include at least a portion that is angled and/or rounded so as to cause the rotational flow. The fins 157 can be built into the shape of the top wall 105 or can be added elements that are attached to the top wall 105 or other part of the pizza oven 100.

The rotational flow of the heated air 151 is particularly advantageous for cooking in the pizza oven 100. For example, there may be hot or cold spots that form within the interior space during the heating process. These hot or cold spots can be generated from a number of sources. For example, because the front of the pizza oven 100 has an opening and/or because the grill top may be opened from the front, the front of the interior space 100 may not be as heated as the rear. By generating a rotational flow, heat from the rear of the interior space 125 is transported to the front of the interior space. This creates a more uniform distribution of heat throughout the interior space 125 than would be present in the absence of the fins 157. Thus, the heated air 151 that is caused to rotate within the interior space helps to cook a pizza or other object within the oven by both cooking by convection and by helping to ensure an even distribution of heat within the interior space 125. This accomplished two objectives. First, a pizza or other food item can be cooked faster than it would without the convective flow. Secondly, the pizza or other food item is cooked more evenly than it would be without the convective flow being rotational. As a result of the more even cooking, the pizza or other food item does not have to be rotated within the pizza oven 100 during the cooking process, as it does in conventional devices. This elimination in the need to rotate the pizza even further contributes to the speed of cooking because the lid does not have to be lifted so the pizza can be rotated during the cooking process. Therefore, there is not the escape of heat that occurs with conventional devices when the pizza is rotated.

The pizza oven 100 may include additional features. For example, as can be seen in FIG. 1A, the pizza oven 100 can include a vent 160 in the top wall 105 that is selectively moveable or rotatable between an open or partially open position and a closed position to allow a desirable amount of moisture and/or heat from the cooking pizza to escape. In the version shown, the vent 160 is located directly above the position of the pizza. Some pizza types, such as New York Style call for a 600-degree cooking temperature. The vent 160 provides a heat release for the extra heat. The pizza oven may also include one or more handles 165 to facilitate handling and placement of the pizza oven 100.

The top wall 105, lateral walls 110, front wall 115, and/or rear wall 120 may be made of any material that can withstand the heat conditions during cooking and ideally of a material that can help retain the heat within the interior space 125. For example, suitable materials include one or more of stainless steel, mild steel, porcelain coated steel, aluminum, and any material used in the manufacture of a grill. The thickness of the walls will depend on the material being used and the desired heat retention and weight properties.

The dimensions of the pizza oven 100 will depend on the size of pizza to be cooked. In general, the pizza oven 100 can have a width from the exterior of lateral wall 110 to exterior of the opposite lateral wall 100 of from about 15 inches to about 35 inches. The depth of the pizza oven 100 from the exterior of the front wall 115 to the exterior of the rear wall 120 can range from about 7 inches to about 22 inches. The pizza oven 100 may be provided in a larger version or in a smaller version to fit different size grills 135. In the larger version, the width can be from about 22 inches to about 35 inches, or from about 22 inches to about 24 inches, or about 23 inches in one particular larger version. Also in the larger version, the depth can be from about 15 inches to about 20 inches, or from about 15 inches to about 17 inches, or about 16 inches in one particular larger version. In a smaller version, the width can be from about 15 inches to about 20 inches, or from about 17 inches to about 19 inches, or about 18 inches in one particular version. Also in the smaller version, the depth can be from about 8 inches to about 14 inches, or from about 9 inches to about 11 inches, or about 10 inches in one particular smaller version. The height from the bottom of the lateral wall 110, front wall 115, or rear wall 120 to the exterior of the top wall can range for both the larger and the smaller versions from about 3 inches to about 6 inches, or from about 4 inches to about 5 inches, or about 4 inches in one particular version. The length of the opening 130 can range from about 11 inches to about 27 inches. In the larger version, the length of opening 130 can range from about 16 inches to about 27 inches, or about 16 inches. In the smaller version, the length of the opening can range from about 12 inches to about 16 inches, or about 14 inches. The height of the opening 130 can range from about 2 inches to about 4 inches, or from about 3 inches to about 4 inches, or about 3.5 inches. The walls can have a thickness of from about 0.3125 inches to about 0.25 inches, or about 0.0625 inches. The wall thickness can vary depending on the material of the walls.

The pizza stone 145, if provided, may be from about 0.5 inches to about 3 inches smaller than the opening 130. The gap 150 may be at least about 1 inch and may range from about 2 inches to about 6 inches, or from about 3 inches to about 4 inches. The volume of the interior space can range from about 1100 in$^3$ to about 12,000 in$^3$, more preferably from about 1230 in$^3$ to about 10,500 in$^3$, most preferably about 3360 in$^3$. In one particular version, a 15-inch square pizza stone 145 made out of ½ inch thick cordierite sits on the grill grates 140, and a 23 inch by 16 inch pizza oven 100 with a height of 4 inches sits over the pizza stone 140.

To use the pizza oven 100, a raw or partially cooked pizza is prepared and set aside. The grill 135 is fired up by turning on the gas or igniting wood or charcoal. The grate 140 is placed over the heat and the pizza stone 145, if used, is placed on the grate, preferably near the center of the heat. The pizza oven 100 is then placed over the pizza stone 140 taking care to carefully position the pizza oven 100 so that the gaps 150 are created between the pizza stone 140 or pizza edge and the lateral walls 110. The interior space 125 is allowed to heat to between 700 and 1000 degrees F. and then the pizza is installed onto the pizza stone 145 or grates 140 through the opening 130 in the front wall 115. A temperature thermometer may be provided in or near the top wall 105 and/or an infrared thermometer can be used to measure the air in the oven 100. The shape of the top wall 105 directs the convective air to towards the center of the pizza and the fins 157 cause the convective air to swirl around the top of the pizza.

As discussed above, because of this rotational pattern of convective flow, hot spots are reduced or eliminated and the pizza does not have to be turned during the cooking process. In addition, the pizza cooks faster. The interior space 125 can be heated within about 15 minutes, and the top and bottom of the pizza can be evenly cooked in less than about 5 minutes. In many instances, the pizza can be cooked in less than 3 minutes, less than 2 minutes, and even in as little as about 90 seconds which is the amount of time it takes for a professional brick oven pizza to cook a pizza. This allows multiple pizzas to be sequentially cooked.

Figure 2A:
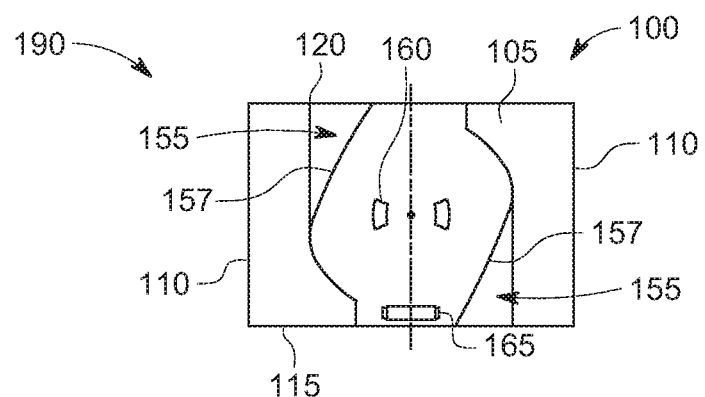
FIG. 2A is a schematic top view of the pizza oven of FIG. 1A.
Figure 2B:
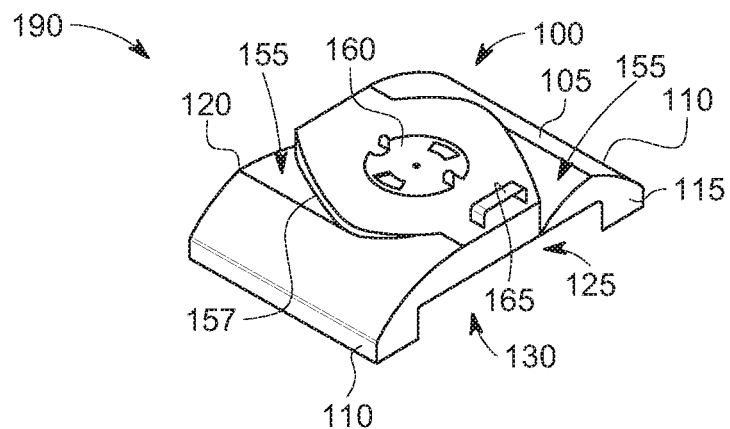
FIG. 2B is a schematic perspective view of the pizza oven from the top front.
Figure 2C:
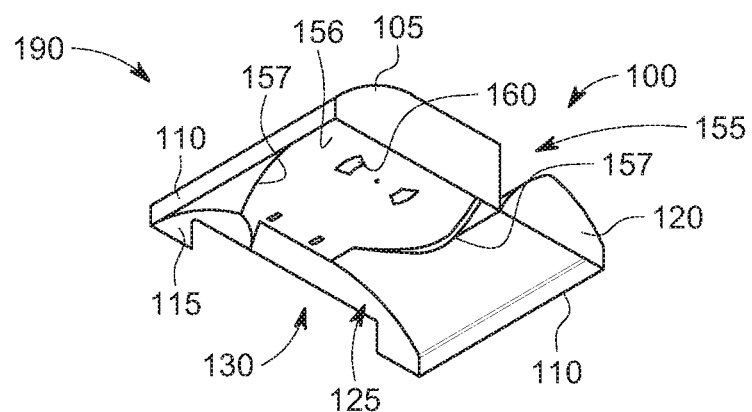
FIG. 2C is a schematic perspective view of the pizza oven from the bottom rear.

FIGS. 2A, 2B, and 2C show in more detail the shape of the top wall 105 and the fins 157 according to one version of a pizza oven 100 of the invention. FIG. 2A is a top view of the top wall 105 and FIG. 2B is a view from above and from the front of the pizza oven 100, both showing the fins 157 as indentations of the top wall 105. As can be seen, the fins 157 can be curved to create the rotational flow and to reduce the likelihood of hot spots. FIG. 2C shows the pizza oven 100 from below and from the rear. From FIG. 2C it can be seen how the fins 157 extend downwardly into the interior space and are shaped to cause a rotational flow. As can also be seen n FIG. 2C, the front wall 115 includes an opening 130 while the rear wall 120 may be at least partially or entirely closed.

In one version, as shown for example in FIGS. 1A, 1B, 2A, 2B, and 2C, the pizza oven 100 may be in the form of a portable unit 190. The portable unit 190 may be separate from the grill 135 and may be used with multiple conventional grill. The portable unit 190 is light weight and carriable. To use the portable unit 190, the portable unit 190 is merely placed on the grates of a grill 135 before, during, or after the grill is being heated. When the cooking process is completed and the pizza oven 100 has cooled down, the portable unit 190 can be removed from the grill 135 and can be separately cleaned and stored.

Figure 3:
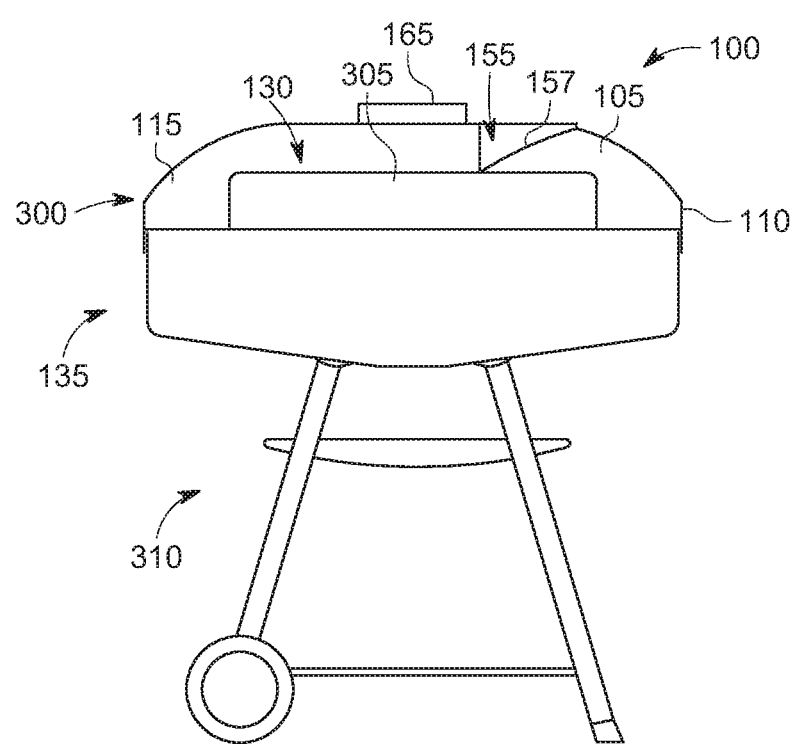
FIG. 3 is a schematic front view of another version of a pizza oven of the invention.

Another version of the pizza oven 100 is shown in FIG. 3. In this version, the pizza oven 100 is integrated into the design of the grill 135, thus making the unit a pizza grill. For example, the grill may have a lid 300 above the cavity and grates that is in the shape of the pizza oven 100 or that includes the pizza oven 300 as an attachment to the lid 300. A removable cover 305 may be provided to cover the opening 130 that provides access to the interior space 135 of the pizza oven 100. The cover 305 can be attachable to the lid 300 in any manner known in the art, such as by being slidable within a track. A knob or handle can be provided on the cover 305 to facilitate gripping. Legs 310 or other support may also be provided to elevate the grill 135 and/or to help transport the grill 135.

In yet another version, similar to that of FIG. 3, the pizza oven 100 may be an intermediary member associated with the grill 135. For example, the pizza oven 100 may fit between the cavity and a conventional lid that comes with the grill 135. The bottom of the pizza oven 100 can mate with the cavity, and the top of the pizza oven 100 can mate with the lid so that the combination of elements retains heat. As with the FIG. 3 version, a cover for the opening 130 can be provided.

Other forms or variations of the pizza oven 140 may be provided without departing from the invention. For example, the sidewall may be round or partially circular, oval, or elliptical. The sidewall including the lateral walls 110 and the rear wall 120 may be formed of one continuous wall. The top wall 105 may be domed, partially domes, flat, or partially flat. In one version, the pizza stone 145 or surface may be permanently attached to the pizza oven 100, provided sufficient gaps 150 are still provided. In another version, the pizza stone 145 may be permanently attached to the grates 140 of the grill 135.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number. Also, the various features of the versions herein can be combined in various ways to provide additional versions of the present invention. Furthermore, certain terminology has been used for the purposes of descriptive clarity, and not to limit the present invention. Throughout this specification and any claims appended hereto, unless the context makes it clear otherwise, the term "comprise" and its variations such as "comprises" and "comprising" should be understood to imply the inclusion of a stated element, limitation, or step but not the exclusion of any other elements, limitations, or steps. Therefore, any appended claims should not be limited to the description of the preferred versions contained herein and should include all such alterations, permutations, and equivalents as fall within the true spirit and scope of the present invention.

What is claimed is:

1. A pizza oven usable on the grates of a grill, the pizza oven comprising:
   a top wall and a sidewall that together define an interior space sized and shaped to receive a food item to be cooked, the top wall including one or more projections extending from an inner surface of the top wall into the interior space,
   wherein when the pizza oven is positioned on the grates of a heated grill, heated air from the grill enters the interior space through a gap between the side walls and the food item, wherein the heated air then contacts the one or more projections and passes over the top surface of the food item to cook the food item by convection, and wherein the one or more projections are sized and shaped to cause the heated air to move in a rotational pattern in the interior space.

2. The pizza oven according to claim 1, wherein the movement of the heated air in the rotational pattern mixes air from the rear of the interior space with air from the front of the interior space to create a more uniform heat distribution than would occur in the absence of the one or more projections.

3. The pizza oven according to claim 1, wherein sidewall comprises a front wall having an opening therein, the opening providing access to the interior space and being sized and shaped that the food item can be inserted into the interior space through the opening.

4. The pizza oven according to claim 1, wherein the one or more projections comprise one or more fins that are at least partially curved to cause the rotational pattern.

5. The pizza oven according to claim 1, wherein a bottom of the pizza oven is open to expose the interior space to the heat from the grill.

6. The pizza oven according to claim 1, wherein a bottom of the pizza oven is open and is sized and shaped to be positionable over a pizza stone sitting on the grates of the grill.

7. The pizza oven according to claim 1, wherein the inner surface of the top wall has a rounded contour.

8. The pizza oven according to claim 1, wherein the top wall and the sidewall provide radiant heat to additionally help to cook the food item.

9. The pizza oven according to claim 1, wherein the top wall comprises a vent.

10. The pizza oven according to claim 1, wherein the top wall comprises a handle.

11. The pizza oven according to claim 1, wherein the pizza oven is portable and separable from the grill.

12. The pizza oven according to claim 1, wherein the pizza oven is an integral part of the lid of the grill.

13. A pizza grill, the pizza grill comprising:
a grill cavity having grates thereabove, and
a pizza oven positionable on the grates, the pizza oven comprising a top wall and a sidewall that together define an interior space sized and shaped to receive a food item to be cooked, the top wall including one or more projections extending from an inner surface of the top wall into the interior space,
wherein when the pizza oven is positioned on the grates and the grill cavity is heated, heated air from the grill cavity enters the interior space through a gap between the side walls and the food item, wherein the heated air then contacts the one or more projections and passes over the top surface of the food item to cook the food item by convection, and wherein the one or more projections are sized and shaped to cause the heated air to move in a rotational pattern in the interior space.

14. The pizza grill according to claim 13, wherein the pizza oven is portable and separable from the grill.

15. The pizza oven according to claim 13, wherein the pizza oven is an integral part of a lid of the grill.

16. A method of cooking a food item on a grill, the method comprising:
heating the grill,
placing a pizza oven on grates of the grill, the pizza oven comprising a top wall and a sidewall that together define an interior space sized and shaped to receive the food item to be cooked, the top wall including one or more projections extending from an inner surface of the top wall into the interior space,
inserting the food item into the interior space, and
cooking the food item in the interior space by allowing heated air from the grill to enter the interior space and to contact the one or more projections so that the heated air passes over the top surface of the food item to cook the food item by convection, wherein the one or more projections are sized and shaped to cause the heated air to move in a rotational pattern in the interior space.

17. The method according to claim 16, wherein the food item is a pizza.

18. The method according to claim 17 wherein the pizza is uncooked when inserted into the interior space and wherein the pizza is evenly cooked without rotation of the pizza during the cooking process.

19. The method according to claim 17 wherein the pizza is uncooked when inserted into the interior space and wherein the pizza is fully cooked in less than 3 minutes.

\* \* \* \* \*